No. 646,800. Patented Apr. 3, 1900.
F. G. BROUGHTON.
MEANS FOR PREVENTING SHIPS FROM SINKING.
(Application filed Aug. 3, 1899.)
(No Model.)
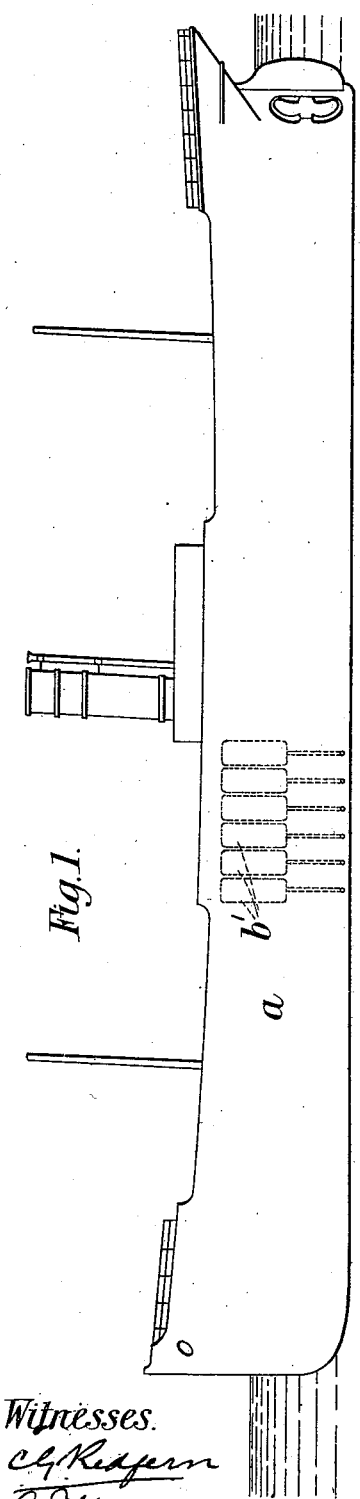
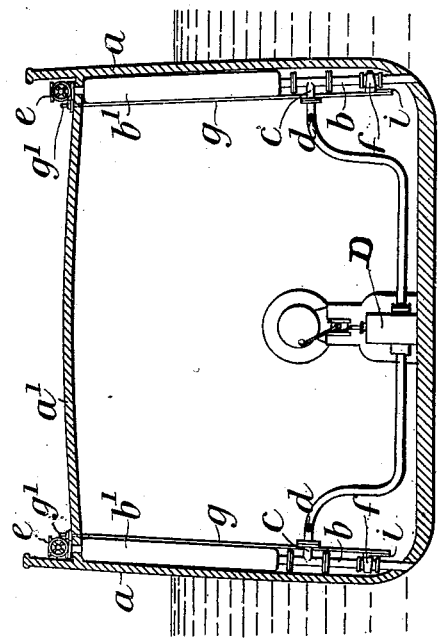
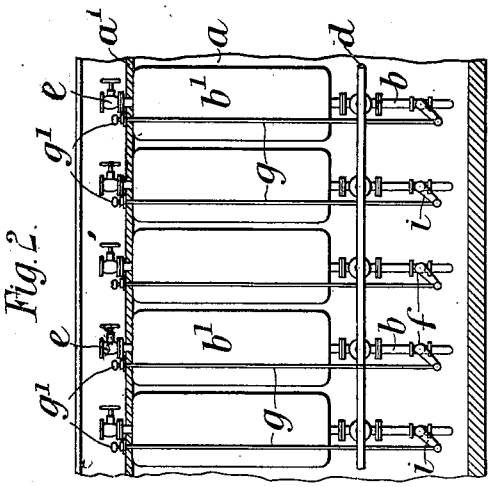
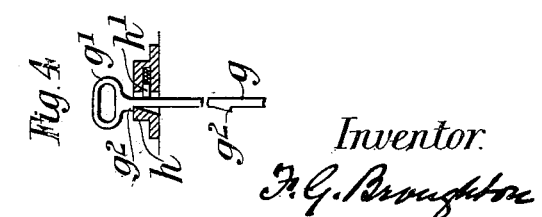
Witnesses.
C. G. Redfern
A. Jllnett
Inventor.
F. G. Broughton

UNITED STATES PATENT OFFICE.

FRED GRANTHAM BROUGHTON, OF ANERLEY, ENGLAND.

MEANS FOR PREVENTING SHIPS FROM SINKING.

SPECIFICATION forming part of Letters Patent No. 646,800, dated April 3, 1900.

Application filed August 3, 1899. Serial No. 726,036. (No model.)

*To all whom it may concern:*

Be it known that I, FRED GRANTHAM BROUGHTON, a subject of the Queen of Great Britain, residing at Anerley, in the county of Surrey, England, have invented new and useful Improved Means for Preventing Ships and other Vessels from Sinking, of which the following is a specification.

This invention relates to improved means for preventing ships and other vessels from sinking.

In carrying out my invention I provide the vessel with a number of upright air pipes or vessels extending from the deck down through the bottom of the vessel, the said air pipes or vessels being closed at their upper ends and open at their lower ends, so that should the vessel by reason of a leak, collision, or from any other cause begin to settle in the water the air inclosed in the said upright pipes is gradually compressed by the water entering them, the contained air being ultimately compressed to such an extent that the pressure thereof counterbalances the tendency of the vessel to settle, thereby preventing its sinking. My air vessels can be arranged so that they can be supplied with compressed air or other suitable gas in order that the air or gas they contain can be maintained at any desired pressure in case of leakage, for example. The air pipes or vessels may be provided with pressure-gages, if desired, and also with valves, so that in case of a vessel listing to one side from any cause the air can be allowed to escape on the opposite side.

It will be obvious that the air vessels can be built in the hull of the vessel.

In the accompanying drawings, Figure 1 is a side elevation of a steamship having my improvements applied thereto. Fig. 2 is a longitudinal section of a portion of the hull. Fig. 3 is a tranverse section of the hull. Fig. 4 is a view of a detail. Figs. 2 and 3 are drawn to a larger scale than Fig. 1, and Fig. 4 to a larger scale than Figs. 2 and 3.

$a$ is the hull of the vessel, and $b\ b$ are the upright air pipes, vessels, or chambers which extend from the deck $a'$ of the vessel to the bottom of the hull, the upper ends being closed and the lower ends opening under the water-level, as clearly shown.

In the drawings I have shown the upright air vessels with an enlarged upper part $b'$, although the said vessels may be of the same cross-sectional area throughout. These air vessels may be entirely closed at their upper ends, as indicated in Fig. 1; but I prefer to provide them with an opening at their upper ends normally closed by a valve, as shown in Figs 2 and 3 and as hereinafter described.

In the arrangement illustrated the air vessels $b\ b$ are designed to be supplied with compressed air or other suitable gas. To this end they are provided with inlet-pipes $c\ c$, which may all, as shown, branch from an air or gas supply pipe $d$. In this instance and by way of illustration I have indicated at D in Fig. 3 a conventional representation of an air-compressor, which may be of any preferred or ordinary type, operated in any suitable manner, and connected to the pipe $d$ for supplying compressed air to the air pipes or chambers $b\ b$.

$e\ e$ are the valves with which the upper ends of the air-pipes $b\ b$ are provided for enabling the air in any one vessel to be allowed to escape—for example, when the vessel lists to one side, in which case the valves $e\ e$ on the opposite side of the vessel are opened, so as to allow the vessel to sink on that side.

$f\ f$ are the valves or cocks which are provided at the lower ends of the air vessels or pipes $b\ b$ for the purpose of cutting off the water-inlet in case the said air-pipes should become leaky. These cocks or valves can advantageously be operated from the deck through the medium of the upright rods $g\ g$, having handles $g'\ g'$ and the upper ends of which are provided with two teeth or shoulders $g^2\ g^2$, adapted to bear upon the upper part of an undercut recessed socket or catch $h$, as clearly shown in Fig. 4. The lower end of each rod $g$ is pivoted to a lever $i$, forming the handle of each cock or valve, so that by raising the rod $g$ from the position shown in Fig. 4 to that in which the lower tooth $g^2$ is caused to rest upon the socket the cocks are closed.

$h'$ is a spring-pin or the like which is mounted in the socket $h$ and is caused to bear against the back of each rod $g$, so as to hold it in the position to which it is moved.

With vessels constructed as above described should leakage supervene from any cause—for example, as the result of a collision—the tendency of the vessel to sink is counterbalanced by the pressure of the air contained in the air vessels or pipes $b\ b$ upon the surface of the water which tends to enter the lower open ends of the said vessels or pipes $b$.

Having now particularly described and ascertained the nature of my said invention and in what manner the same is to be performed, I declare that what I claim is—

1. In a ship or vessel, the combination with the hull, of a series of air-chambers provided with vertically-disposed normally-open portions extending outside the hull below the water-line, whereby in case the vessel settles in the water, the upward pressure of the water in said vertical portions, will compress the air in said air-chambers until the pressure thereof counterbalances the tendency of the vessel to sink, substantially as described.

2. In a ship or vessel, the combination with the hull, of a series of vertically-disposed air-chambers, located therein provided with vertically-disposed normally-open portions extending outside the hull below the water-line, said air-chambers being provided with air-outlets and closing devices for said air-outlets, whereby in case the vessel settles in the water, the upward pressure of the water in said open portions of the air-chambers will compress the air in said chambers until the pressure thereof counterbalances the tendency of the vessel to sink, substantially as described.

3. In a ship or vessel the combination with the hull, of a series of vertically-disposed air-chambers having normally-open portions extending outside the hull below the water-line, whereby the upward pressure of the water in said open portions will tend to compress the air in said chambers in case the vessel settles, and means for supplying air or gas under pressure to increase the fluid-pressure in said chambers, when desired, substantially as described.

4. In a ship or vessel, the combination with the hull, of a series of vertically-disposed air-chambers, located at different points longitudinally of the hull, and provided with normally-open portions extending outside the hull below the water-line, whereby in case the vessel settles the upward pressure of the water in said open portions will tend to compress the air until the pressure thereof counterbalances the tendency of the vessel to settle, a fluid-compressing device, and connections between said compressing device and said chambers for supplying them with fluid under pressure when desired to increase the downward pressure of the compressed fluid upon the water, substantially as described.

5. In a ship or vessel, the combination with the hull, of a series of vertically-disposed air-chambers, each having a normally-open lower portion extending outside the hull, below the water-line, and an air-outlet aperture adjacent to its upper end, valves for closing said air-outlet apertures, and valves for closing said normally-open lower portions, whereby in case the vessel settles in the water, said air-outlet valves being closed and said lower portions being open, the upward pressure of the water in the lower portions of said air-chambers will compress the air therein until the pressure thereof counterbalances the tendency of the vessel to settle, substantially as described.

6. In a ship or vessel, the combination with the hull, of a series of vertically-disposed air-chambers provided with openings at their upper ends, and having their lower ends opening outside of the hull below the water-line, controlling-valves for said openings in the upper ends of said chambers, controlling-valves for controlling the admission of water through their lower ends, and means for supplying compressed air to said chambers, substantially as described.

FRED GRANTHAM BROUGHTON.

Witnesses:
C. G. REDFERN,
A. ALBUTT.